United States Patent [19]

Kustom et al.

[11] 4,086,506
[45] Apr. 25, 1978

[54] CONTRA-ROTATING HOMOPOLAR MOTOR-GENERATOR FOR ENERGY STORAGE AND RETURN

[75] Inventors: Robert L. Kustom, Palos Heights; Robert B. Wehrle, Downers Grove, both of Ill.

[73] Assignee: The United States of America as represented by the United States Department of Energy, Washington, D.C.

[21] Appl. No.: 711,903

[22] Filed: Aug. 5, 1976

[51] Int. Cl.² ............................................. H02K 7/02
[52] U.S. Cl. .................................... 310/74; 310/178; 310/126; 310/113; 74/572
[58] Field of Search .................... 310/74, 67, 90, 112, 310/126, 114, 178, 113, 102 A, 102 R; 74/572

[56] References Cited

U.S. PATENT DOCUMENTS

| 645,943 | 3/1900 | Dalen et al. | 310/178 |
|---|---|---|---|
| 3,022,433 | 2/1962 | Ferranti | 74/572 X |
| 3,163,792 | 12/1964 | Sayers | 310/178 X |
| 3,293,470 | 12/1966 | Polgreen | 310/178 |
| 3,365,958 | 1/1968 | Bard et al. | 310/90 UX |
| 3,436,572 | 4/1969 | Storsand | 310/74 |
| 3,579,005 | 5/1971 | Noble | 310/178 |
| 3,586,894 | 6/1971 | Mueller | 310/178 |
| 3,646,394 | 2/1972 | Swartz et al. | 310/126 X |
| 3,683,216 | 8/1972 | Post | 310/74 |
| 3,737,694 | 6/1973 | Rabenhorst | 310/74 |
| 3,970,917 | 7/1976 | Diggs | 310/74 X |
| 4,032,807 | 6/1977 | Richter | 310/178 |
| 4,034,248 | 7/1977 | Mole et al. | 310/113 X |

Primary Examiner—Donovan F. Duggan
Attorney, Agent, or Firm—Dean E. Carlson; Frank H. Jackson; Donald P. Reynolds

[57] ABSTRACT

An apparatus for receiving electrical energy in amounts of the order of hundreds of megajoules, converting the electrical energy to mechanical energy for storage, and delivering the stored energy as electrical energy in times of the order of a second comprises a sequence of stacked electrically conducting cylindrical shells having a common axis. The conducting shells are free to rotate and are separated by stationary insulating cylindrical shells. Adjacent conducting shells are connected electrically by brushes at the edges and a radial magnetic field is caused to pass through the conductors. The apparatus permits the reversal in a plasma heating coil of electric currents of amplitudes up to 100,000 amperes in a time of the order of a second.

4 Claims, 2 Drawing Figures

CONTRA-ROTATING HOMOPOLAR MOTOR-GENERATOR FOR ENERGY STORAGE AND RETURN

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an apparatus for storing energy mechanically and delivering it as electrical energy to a heating coil in a time of the order of a second.

Development of the Tokamak experimental power reactor has created the need for a device to couple electrical energy into a plasma for ohmic heating. It is proposed to accomplish the ohmic heating by transformer action from an ohmic heating coil in which an electric current of the order of 100,000 amperes is caused to reverse its direction in a time of the order of one second. During the time that the electric current in the ohmic heating coil is approaching and passing through zero, the electrical energy in the coil must be transferred out of the coil and returned to the coil in a short period of time. It is possible to dissipate that energy and to supply more for the buildup of current in the reverse direction but this is wasteful of energy and represents a situation to avoid. A static capacitor represents an improvement over the situation previously described in that the capacitor can store and return electrical energy. However, the requirements presently contemplated for the Tokamak experimental power reactor include the storage of energy to a value as high as 1000 megajoules with coil currents ranging between 40,000 and 100,000 amperes and coil voltages of 50,000 to 150,000 volts. The value of the capacitance must also be selected to tune with the inductance of the ohmic heating coil to permit a reversal of current in the desired time, of the order of one second. In particular, the value of the currents and the associated ohmic losses associated with the use of a static capacitor, and the fact that any capacitor so used must be capable of being charged in either direction result in a value of energy density that is unsatisfactorily low.

It is an object of the present invention to provide a better means of storing and returning electrical energy.

It is a further object of the present invention to provide an energy transfer and storage system to handle efficiently large amounts of electric energy.

It is a further object of the present invention to provide an energy transfer and storage system that will match the inductance of an ohmic heating coil to permit reversal of the current in the coil in one second.

Other objects will become apparent in the course of a detailed description of the invention.

SUMMARY OF THE INVENTION

An apparatus for receiving electric energy, storing it as rotating mechanical energy and converting it to electrical energy with magnitudes of the order of 1000 megajoules cycled in one second comprises a sequence of electrically conductive rotating coaxial cylindrical shells separated radially by electrically insulating stationary coaxial cylindrical shells. Adjacent coaxial conducting shells are connected electrically by brushes at their ends in an alternating pattern and a radially directed magnetic field is caused to pass through the cylinders. Air bearings in the nonconducting cylindrical shells ease motion of the conducting shells and the resulting forces on the application of a voltage to the inner and outer concentric shells is a sequence of alternately counter-rotating cylindrical shells that store most of the applied electrical energy as mechanical energy of rotation.

DETAILED DESCRIPTION OF THE INVENTION

Figure 1:
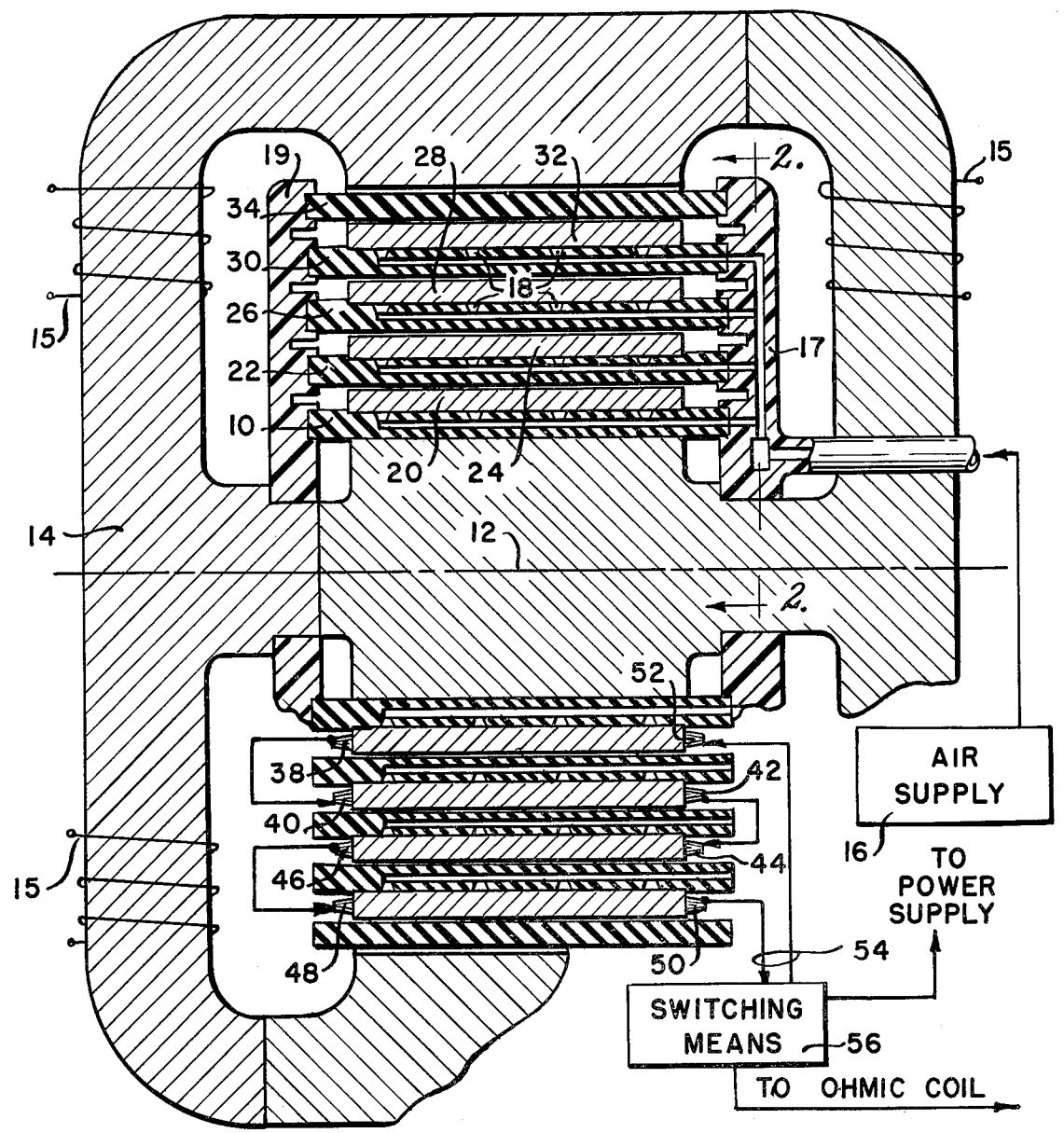
FIG. 1 is a partial sectional side view of an apparatus for the practice of the present invention.
Figure 2:
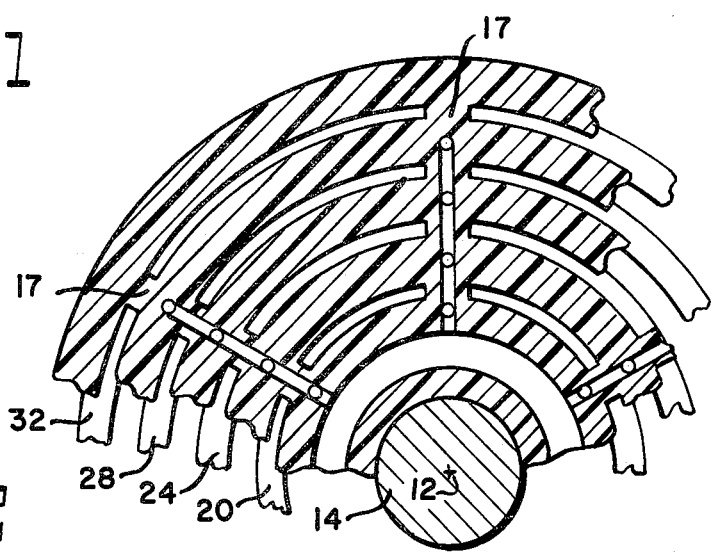
FIG. 2 is a partial sectional end view of the apparatus of FIG. 1 taken along section lines 2—2 of FIG. 1.

FIG. 1 is a partial sectional side view of an apparatus for the practice of the present invention, and FIG. 2 is a partial sectional end view along section lines 2—2 of FIG. 1. In the figures, insulating cylindrical shell 10 is disposed about axis 12 in the radially directed magnetic field of electromagnet 14. Coils 15 of electromagnet 14 may be normal conductors or superconductors. Insulating cylindrical shell 10 is connected to air supply 16 which supplies air through a plurality of radially directed bearing holes 18. Insulating cylindrical shell 10 is grooved to contain a conducting cylindrical shell 20 which is free to rotate about axis 12 and is kept from close frictional contact with insulating cylindrical shell 10 by the passage of air through bearing holes 18.

A pattern of stacked nested alternating coaxial insulating and conducting shells is continued in the figure with, in sequence radially outward from axis 12, insulating shell 22, conducting shell 24, insulating shell 26, conducting shell 28, insulating shell 30, conducting shell 32 and insulating shell 34. Each of the insulating shells 22, 26 and 30 is grooved to retain its associated conducting cylindrical shell 24, 28 and 32, respectively, and each is connected to air supply 16 by spokes 17 and 19 to supply air under pressure to air bearing holes 18 in insulating cylindrical shells 22, 26 and 30 while keeping shells 10, 22, 26, 30, and 34 fixed in position. The figures shows four stacked conducting cylindrical shells but this number is not significant. The number of cylindrical shells that is necessary is readily calculable from the amount of energy to be stored and the maximum peripheral speed of rotation of the cylindrical shell when it is storing the desired amount of energy. It will generally be desirable, though, to have an even number of conducting cylindrical shells to minimize the gyroscopic torque associated with acceleration of the conducting shells to a high angular velocity. This follows because adjacent conducting shells are connected as follows. Conducting shell 20 is connected to brush 38 which, in turn, is connected through brush 40 to conducting cylindrical shell 24 at an outer edge of each of the conducting cylindrical shells 20 and 24. Conducting cylindrical shell 24 is in turn connected electrically to brush 42 at the opposite edge and brush 42 in turn is connected electrically to brush 44 and thence to conducting cylindrical shell 28. Brush 46 is connected to conducting cylindrical shell 28 at the edge opposite to that of brush 44 and an electrical connection from brush 46 to brush 48 makes sliding electrical contact at an edge of conducting cylindrical shell 32. A brush 50 is connected to cylindrical conducting shell 32 at the edge opposite to that of brush 48 and a brush 52 is connected to conducting cylindrical shell 20 at the edge opposite to that of brush 38. Brushes 50 and 52 serve as input and output brushes. They are connected to input and output leads 54 which are connectable to an ohmic coil through switching means 56. A connection may also be made to a power supply through switching means 56 to deliver electrical energy for storage in conducting cylindrical shells 20, 24, 28, and 32 over a relatively long period of time so that it is not necessary to have a power supply capable of delivering the power required by the ohmic heating coil. Switching means 56 will also typically include means for reversing a connection to the ohmic coil, although normal operation of a system including the apparatus of the figure will involve two stages of preparation. The first is to connect a power supply through switching means 56 to accelerate the electrically conducting cylinders 20, 24, 28, and 32. Switching means 56 will then be operated to deliver energy to the ohmic coil, and leave the conducting cylinders 20, 24, 28, and at rest while maintaining a short circuit across the ohmic coil. The apparatus is then ready. Restoration of a connection between the ohmic coil and leads 54 causes a rapid acceleration of the conducting cylinders 20, 24, 28 and 32 as the current in the ohmic coil decreases. When the current in the ohmic coil is at zero, the conducting cylinders are rotating at maximum angular velocity and what was formerly electrical energy in the ohmic coil is now mechanical energy stored in the rotating cylinders. The voltage across leads 54 is then such as to cause the current in the ohmic coil to build to a maximum in the reverse direction, while the rotating conducting cylinders come to a stop. Switching means 56 will disconnect leads 54 and establish an alternate complete circuit through ohmic coil 56. The circuit is restored to the initial ready condition with current reversed in the ohmic coil by reestablishing the connection of the ohmic coil to leads 54 through switching means 56. The cycle just described is reversed to reset the ohmic coil to a ready position.

It is a matter of relatively routine analysis to show that, under the assumption of a uniform magnetic field if the radial thickness of each of the conducting cylinders varies inversely with the radius, the surface velocity of rotation of each cylinder will be the same. This velocity sets a limit upon the amount of energy that can be stored in each shell. For maximum efficiency of use of the counter-cyclonic generator, it is desirable to accelerate each of the conducting cylindrical shells to a speed that places it within the same safety factor of self-destruction due to rotational forces. A routine mathematical analysis leads to the conclusion that the conducting cylindrical shell is analogous electrically to a capacitor of a value given by $$C = \frac{J}{(Bl)^2 r^2}$$

In this expression, J is the moment of inertia of the shell, B is the magnetic flux density at the shell, $l$ is the length along the shell, the bracketed quantity is the product of flux density and length integrated along the shell, and $r$ is the radius of the cylinder. A design for most effective use of the sequence of cylinders will make the capacitance of each of the cylinders approximately equal to that of each of the others. Such a result is achieved by making the drum thickness according to the following expression:

$$t = \frac{I(Bl)}{2\pi^2 \rho l r v}$$

where $\rho$ is the density of the material of the cylinder, $v$ is the surface velocity of rotation of the cylinder, and I is the peak value of current along the cylinder.

It is should be evident that various choices are open to the designer in the practice of the present invention. For example, FIGS. 1 and 2 illustrate a design in which the rotational axis of the cylinders is horizontal and the main component of force supported by the air bearings is thus vertical. It is equally possible to direct the axis of symmetry vertically and to support the cylinders on their edges with air bearings with supplementary air bearings exerting horizontal radial forces to guide the rotation. Similarly, although the figures illustrate a counter-cyclonic generator having four conducting cylinders, the number of pairs of cylinders is a function of the design parameters and can be varied by the designer. An example follows as a result of calculations designed to supply a peak operating current of 100 kiloamperes to a coil having an inductance of 0.1776 H. The peak voltage required of a counter-cyclonic generator to reverse this current in the desired time of 1 second is 55,500 volts. These requirements were met by a design using 8 series-connected modules, each module of which was constructed using 8 concentric coaxial cylindrical shells. The conducting cylindrical shells are of nonmagnetic stainless steel of high tensile strength rotating at a maximum surface speed of 236 meters per second. Each shell has an axial length of 0.9 meter. The calculated dimensions for each of the cylinders are listed in Table I. Since the shells are connected in series, the total voltage of the module is the sum of the shell voltages, while the total capacitance is the reciprocal of the sum of the reciprocals of the shell capacitance.

TABLE I

| Cylinder Number | Inner Radius m | Radial Thickness m | Induced Voltage V | Effective Capacitance F | Stored Energy MJ |
|---|---|---|---|---|---|
| 1 | 0.9250 | 0.0152 | 1086 | 29.3 | 17.3 |
| 2 | 0.9773 | 0.0147 | 1104 | 28.8 | 17.6 |
| 3 | 1.0291 | 0.0140 | 1114 | 28.6 | 17.7 |
| 4 | 1.0802 | 0.0135 | 1123 | 28.3 | 17.8 |
| 5 | 1.1308 | 0.0131 | 1140 | 27.9 | 18.1 |
| 6 | 1.1810 | 0.0126 | 1152 | 27.6 | 18.3 |
| 7 | 1.2307 | 0.0123 | 1168 | 27.3 | 18.6 |
| 8 | 1.2801 | 0.0120 | 1180 | 27.0 | 18.8 |
| Total CCG Module | | | 9067 | 3.51 | 144.2 |

The embodiments of the invention in which an exclusive property or privilege is claimed are defined as follows:

1. An apparatus for receiving electrical energy, storing the energy as rotational mechanical energy, and delivering the stored energy to a load as electrical energy, the apparatus comprising:
   a. a plurality of electrically conducting nested coaxial concentric cylindrical shells;
   b. a plurality of electrically insulating cylindrical shells coaxial and concentric with each other and with the conducting shells and disposed to insulate the conducting shells from each other;
   c. an electromagnet disposed to produce a magnetic flux that is directed radially through the conducting shells;
   d. a plurality of air bearings disposed to support the conducting shells in rotation about an axis;

e. an air supply connected to the air bearings to supply air flow therethrough;
f. a plurality of spokes connected to the electromagnet and to the insulating cylindrical shells to maintain the insulating shells in fixed irrotational engagement;
g. a plurality of brushes connected to the conducting shells at edges thereof to create a series electric circuit therethrough that carries electric current in opposite axial directions in adjacent conducting shells;
h. a first terminal connected to one of the brushes that is connected to an innermost conducting shell; and
i. a second terminal connected to one of the brushes that is connected to an outermost conducting shell to form a series circuit through the conducting shells and brushes to the first terminal, whereby electrical energy that is supplied to the first and second terminals is stored as rotational mechanical energy in the conducting cylinders for delivery as electrical energy to a load.

2. The apparatus of claim 1 comprising in addition:
a. an electric power supply;
b. switching means connected to the power supply and to the first and second terminals for switching the power supply to the first and second terminals to supply electrical energy thereto and for switching the terminals to exchange electrical energy with a coil.

3. The apparatus of claim 1 wherein the radial thickness of each of the conducting shells is substantially inversely proportional to the radius of the shell.

4. The apparatus of claim 1 wherein the plurality of conducting shells is an even number.

* * * * *